(12) United States Patent
Wells et al.

(10) Patent No.: US 12,530,275 B2
(45) Date of Patent: Jan. 20, 2026

(54) ORCHESTRATION OF ANALYTICS IN WORKLOAD RESOURCE DOMAINS

(71) Applicant: Cisco Technology, Inc., San Jose, CA (US)

(72) Inventors: Ian James Wells, San Jose, CA (US); Viktor Mats Emanuel Leijon, San Jose, CA (US); Arghya Mukherjee, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 820 days.

(21) Appl. No.: 17/686,206

(22) Filed: Mar. 3, 2022

(65) Prior Publication Data

US 2023/0281100 A1    Sep. 7, 2023

(51) Int. Cl.
*G06F 11/34*    (2006.01)
*G06F 11/07*    (2006.01)
*G06F 11/30*    (2006.01)
*G06F 11/32*    (2006.01)

(52) U.S. Cl.
CPC ...... *G06F 11/3414* (2013.01); *G06F 11/0754* (2013.01); *G06F 11/0772* (2013.01); *G06F 11/3051* (2013.01); *G06F 11/327* (2013.01)

(58) Field of Classification Search
CPC ............ G06F 11/3051; G06F 11/3414; G06F 11/3466; G06F 11/3409; G06F 11/327; G06F 11/3006; G06F 11/302; G06F 11/0772; G06F 11/0754
See application file for complete search history.

(56) References Cited

U.S. PATENT DOCUMENTS

| | | | |
|---|---|---|---|
| 9,515,905 B1* | 12/2016 | Blanding | H04L 43/0876 |
| 10,678,666 B1* | 6/2020 | Gauf | G06F 11/2635 |
| 2007/0025528 A1* | 2/2007 | Knott | H04M 3/10 379/32.01 |
| 2015/0326535 A1 | 11/2015 | Rao et al. | |
| 2018/0027060 A1* | 1/2018 | Metsch | G06F 3/0664 |
| 2018/0275893 A1* | 9/2018 | Nguyen | G06F 11/3058 |
| 2018/0316543 A1* | 11/2018 | Hwang | H04L 43/50 |
| 2018/0375726 A1 | 12/2018 | Xia | |

(Continued)

FOREIGN PATENT DOCUMENTS

WO    WO2018128894    7/2018

*Primary Examiner* — Michael J Dalbo
(74) *Attorney, Agent, or Firm* — Lee & Hayes, P.C.

(57) ABSTRACT

Techniques are described for configuring and using analytics for requested software components deployed within cloud-based and other distributed computing environments. An orchestration system may determine particular analytics for a requested component implemented within a computing environment, based on the deployed workloads and/or computing resources on which the requested component was deployed. In conjunction with orchestration of the requested component, the orchestration system may determine the associated performance metrics, including particular telemetry metrics and/or composite metrics, based on the orchestration of the requested component. The orchestration system also may manage the presentation of the performance analytics for the requested component, including customized dashboards with component-specific metrics and/or alerts to target devices associated with the requested component.

20 Claims, 6 Drawing Sheets

(56) References Cited

U.S. PATENT DOCUMENTS

| | | | |
|---|---|---|---|
| 2019/0050265 A1* | 2/2019 | Vijayaraghavan | G06N 3/08 |
| 2019/0109756 A1 | 4/2019 | Abu Lebdeh et al. | |
| 2019/0235765 A1* | 8/2019 | Crawford | G06Q 10/107 |
| 2020/0136994 A1* | 4/2020 | Doshi | H04L 41/5009 |
| 2020/0167196 A1* | 5/2020 | Smith | H04L 41/5054 |
| 2021/0144071 A1 | 5/2021 | Young et al. | |
| 2022/0335317 A1* | 10/2022 | Segner | G06N 20/00 |
| 2022/0413992 A1* | 12/2022 | Nguyen | G06F 11/3428 |
| 2023/0060758 A1* | 3/2023 | Fedida | H04L 41/0895 |

* cited by examiner

ORCHESTRATION OF ANALYTICS IN WORKLOAD RESOURCE DOMAINS

TECHNICAL FIELD

The present disclosure relates generally to configuring the analytics for software deployed within cloud-based and other distributed computing environments. In particular, the present disclosure relates to using a workload orchestration system to determine, collect, and present a set of performance metrics associated with a software component, based on the deployed workloads of the software component and the computing resources on which the workloads are deployed.

BACKGROUND

Cloud computing involves using a network of servers hosted remotely on the Internet, rather than local servers or personal computers, to store, manage, and process data. Cloud computing networks for large-scale systems commonly may use deployment models, in which private clouds and/or on-premise infrastructures may be allocated for storing or processing private and secure data, while one or more public clouds may be used for storing or process other non-secure system data. These hybrid cloud computing environments may allow architectural flexibility and scalability with respect to processing demand, as well as allowing integration of specialized computational models.

With such computing environments, service providers may offer analytics and/or performance monitoring services to provide users the capabilities to monitor the performance of certain software components, and to detect and diagnose failures of the software components. These service providers may maintain networks of data centers which house devices, including servers, routers, and other devices, to provide various computing resources to users. When deploying a software component, such as service, network function, or general-purpose application, within such networks, various workloads may be deployed to different computing resources within one or more workload resource domains (e.g., clouds and/or datacenters). The workloads may operate in conjunction across different computing resources and/or workload resource domains to provide the desired functionality of the software component. Additionally, some or all of these computing resources, including servers, devices, services, networks, etc., may collect analytics data including performance metrics for their respective resources.

For instance, resources provided by a cloud-based environment and/or on-premise datacenter may include compute resources, networking resources, storage resources, database resources, application resources, security resources, and so forth. Modern-day networks deliver various types of network architectures to implement complex computing environments that may include any number of workload resource domains, each of which may operate any number of computing resources. For instance, computing resources may be implemented within Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth. Additional devices (e.g., user devices) may utilize these computing resources, for example, to request implementation of new software components and to monitor the performance of existing components. These additional devices may include computers (such as laptops, desktops, servers, smartphones, and tablets) and various other types of devices, which may include an ever-expanding array of Internet-of-Things (IoT) devices (such as cameras, door locks, doorbells, refrigerators, audio/visual systems, thermostats, and various sensors).

Within computing resources and/or workload resource domains, analytics services may be utilized to track performance metrics associated with the computing resources. The performance metrics may include information relating to the computing resources used to process workloads. In some cases, computing resources may be associated with physical computing machines or virtual computing machines (or "virtual machines (VMs)"). The VMs may be scaled across physical servers in a workload resource domain (e.g., cloud) network. Each hardware piece of several pieces of hardware may perform a single function, or each VM of several VMs within a single piece of hardware may perform actions of one or more virtual network functions (VNFs). Containers may act as an operating system (OS) virtualization for network function virtualization. The containers may share the same host OS of a VM or run individual VNFs in an isolated manner such that each VM supports multiple containerized VNFs. The workloads may be routed to computing resources (e.g., network components (or "network devices") in a serverless network by performing optimization of deployment locations including the computing resources.

Various analytics services and tools may be used for performance monitoring of computing resources within workload resource domains. Certain analytics tools may be used to output perform information associated with utilization of the computing resources, such as the CPU load, users, memory utilization, network usage/performance metrics, service requests processed, particular files/memory accessed, etc. The analytics tools may be further utilized to identify information associated with data exchanged between various computing resources, such as devices that maintain databases, execute operating systems, and the like. The performance metrics generated by analytics tools may be retrieved, for example, from telemetry data repositories associated with the computing resources and/or workload resource domains.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
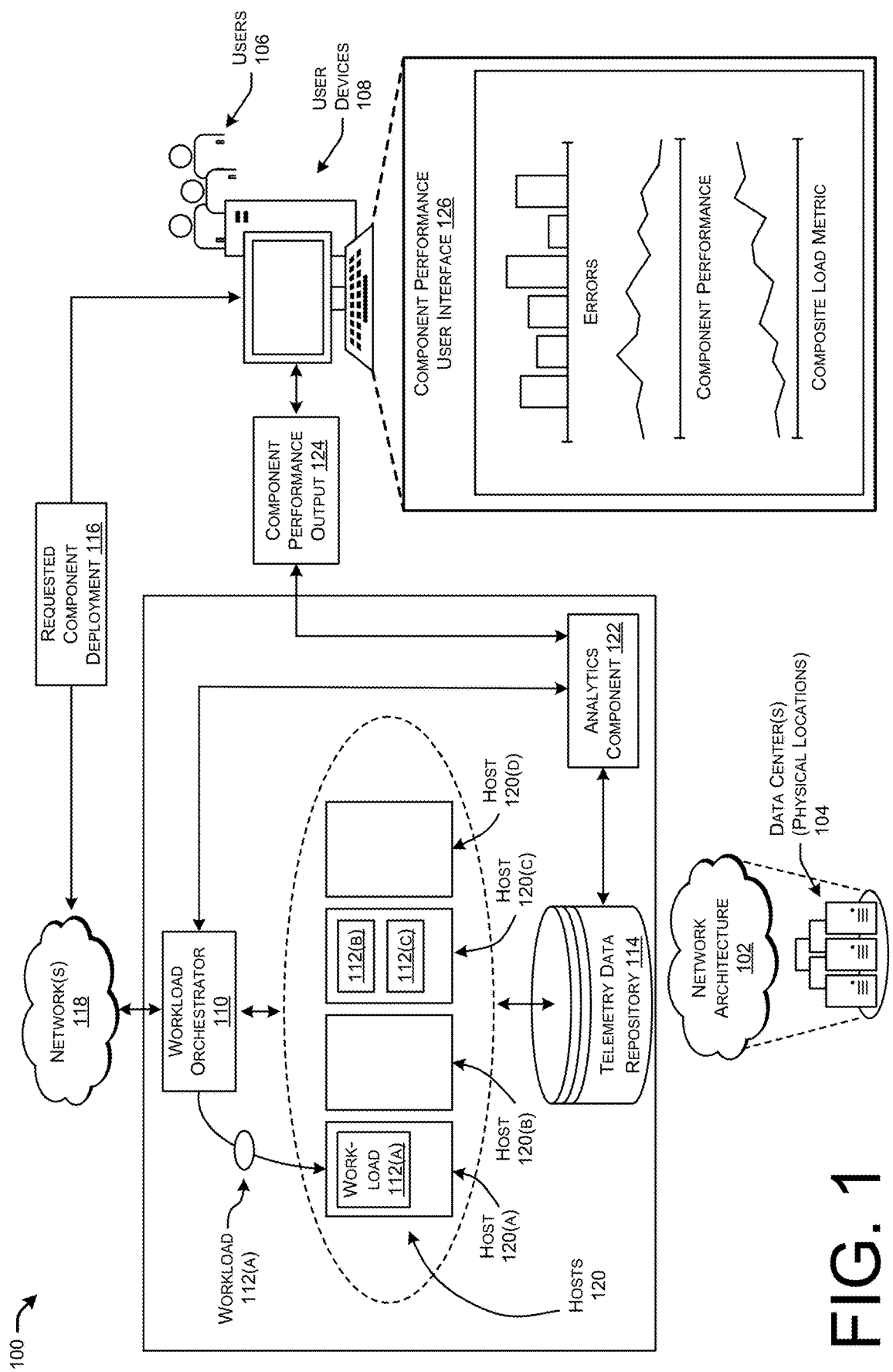
FIG. 1 illustrates a system-architecture diagram of an environment that includes a network architecture that may include one or more data centers, and in which a user of a user device utilizes a workload orchestrator to implement and execute a workload.

The present disclosure relates generally to configuring and using analytics for software components deployed in workload resource domain computing environments.

In various techniques described herein, an orchestration system associated with a computing environment may receive data for a software component to be implemented within the computing environment. For example, the orchestration system may receive a request from an entity (e.g., user or customer) associated with the computing environment, including a network topology model representing a requested software component to be implemented in the computing environment. A computing environment may include one or more workload resource domains, such as public clouds, private clouds, hybrid clouds, and/or on-premise computing infrastructures. Each workload resource domain may include any number of computing resources, including compute resources, networking resources, storage resources, database resources, application resources, security resources, etc., that may be used to implement the software component. The software component may be for example, a service, network function, or a general-purpose application requested for implementation within the computing environment. To implement a software component, the orchestration system may determine and deploy any number of workloads on various computing resources within the computing environment.

In some examples, in conjunction with implementing the software component, the orchestration system may configure the analytics within the computing environment to determine and present a particular set of performance metrics associated with the software component. For instance, the orchestration system may select existing performance metrics and/or may generate additional performance metrics (e.g., composite metrics) based on the particular workloads deployed and the computing resources on which the workloads were deployed. In some examples, determining performance metrics also may be based on the entity (e.g., customer, tenant, service, etc.) that requested the implementation of the software component. To configure the analytics, the orchestration system may instruct an analytics component, one or more networks, and/or various individual computing resources, to collect the performance metrics determined for the software component. In some examples, the analytics component may retrieve and/or generate performance metrics for the specific software component, based on data received from one or more telemetry data repositories associated with the computing resources and/or workload resource domains. For instance, the orchestration system and/or the analytics component may be configured to request and receive network data/network analytics from the networks on which the software component workloads are deployed. In order to request a particular set of network analytics relevant to the deployed workloads, the orchestration system may determine various network data sources associated with the deployed workloads, including network devices (e.g., switches, routers, and wireless), computer servers (e.g., message logging servers, DHCP servers, AAA servers, configuration databases, etc.), and traffic-flow details (e.g., wireless congestion, data speeds, latency, etc.). A presentation component associated with the orchestration system may output the performance metrics to one or more client devices associated with the software component. For instance, component-specific performance data may include a custom analytics dashboard based on the deployed workloads of the software component, and/or via alerts to various client devices based on performance thresholds associated with the performance metrics.

The techniques described herein may be performed, for example, as methods, by a system and/or device having non-transitory computer-readable media storing computer-executable instructions that, when executed by one or more processors, performs the various operations described above.

Example Embodiments

Cloud computing has continued to evolve and become more complex in terms of how workloads are processed and managed by computing resources (or "computing resource components") of workload resource domains (e.g., cloud computing networks and/or on-premise infrastructures). For instance, analytics technologies may include analytics tools and services utilized to monitor the performance and effectiveness of computing resources that execute workloads. Analytics technologies may be utilized to collect information associated with program execution (or "workload execution"), internal states of software being executed utilizing the computing resources, and communications exchanged between components of the computing resources. Analytics technologies may utilize various techniques and tools, such as techniques and tools associated with telemetry, logging, tracing, and the like.

As noted above, analytics may be used within cloud computing environments, hybrid cloud environments, on-premise computing infrastructures, etc., to collect and analyze information associated with the execution of software components deployed on various computing resources. However, the complexity of the software components and the computing environments may present a number technical challenges in collecting and analyzing analytics to evaluate the performance and diagnose failures associated with the software components. As used herein, software components may include services, network functions, and/or general-purpose applications, any of which may be implemented via workloads executing on computing resources within one or more workload resource domains. In some examples, complex software components may be implemented based on network topology models, and an orchestration system may use the topology model to determine a number of components to be created, deployed, and/or configured within various computing resources in the environment. The performance of a deployed software component may be affected by any number of failures, errors, and/or performance issues within any of the computing resources running any of the workloads of the software component.

In such environments, determining and analyzing a set of relevant analytics for a software component can be technically challenging and time-consuming task. For example, failures or performance issues within any of the computing resources on which the software component workloads are deployed can affect the performance of the software component. Further, the entity requesting the implementation of the software component and/or the entity requesting analytics on the software component, might not know what workloads have been deployed, or on which computing resources, to implement the software component. Therefore, it may be difficult or impossible for such entities to collect relevant performance metrics for the software component. Additionally, the various computing resources within the computing environment each may execute multiples workloads associated with various different software components. As a result, failures or performance issue within a computing resource may affect multiple workloads associated with different independent software components, and the root cause of such failures or performance may be attributable to one or specific workloads, or to none of the workloads, on the computing resource.

To address the technical challenges and inefficiencies described herein, this disclosure describes techniques and mechanisms for configuring and using analytics for software components deployed in workload resource domain computing environments. In some examples, an orchestration system may be used to implement a software component based on a network topology model. To implement the software component, the orchestration system may determine and deploy workloads on various computing resources, including creating and/or configuring applications and devices within the computing environment to perform the functionality of the software component. In conjunction with implementing the software component, the orchestration system may configure the collection, analysis, and presentation of analytics data associated with the software component. For instance, the orchestration system may select a particular subset of the performance metrics generated by the computing resources (e.g., including networks and/or other computing resources described herein) on which the workloads were deployed to implement the software component. The performance metrics may be selected based on the workloads deployed, the locations and/or network on which the workloads were deployed, the context (or purpose) of the workloads within the overall functionality of the software component, and/or the entity that requested the implementation of the software component.

In some examples, the orchestration system may instruct an analytics component to retrieve and/or analyze a subset of performance metrics generated by a various computing resources in the environment that are relevant to the operation of the software component. For instance, the orchestration system may determine a composite metric based on a combination of underlying performance metrics output by one or more computing resources on which the software component is deployed. Additionally or alternatively, the orchestration system may directly configure the computing resources in the environment to collect, analyze, and output particular combinations of performance metrics relevant to the software component. In addition to configuring the analytics based on the particular workloads and computing resources on which the software component is deployed, the orchestration system also may configure the presentation (or output) of the analytics. For example, configuring the presentation of the analytics may include configuring outputs of particular performance metrics to client devices via reports, dashboards, and/or alerts. The configuration of the analytics collection, analysis, and outputs for the software may be based on a combination of the deployed workloads, the additional workloads and/or functionality of the software component, and/or the entity that requested the implementation of the software component.

As described herein, workloads generally are programmatic functions where pieces of code are executed by computing resources within workload resource domains (or networks), such as cloud networks or on-premise networks. Such functions may include compute functions, storage functions, and network functions, etc. Workloads also may include specific applications, services, capabilities, or specific amounts of work that can be run on a computing resource. For instance, various workloads may be implemented to perform computational tasks, storage tasks, and network functions, as well as network functions, implementing and executing virtual machines, databases, containers, Hadoop nodes, applications, etc. The computing resources to which the workloads are deployed may include physical computing machines (or "workstation elements"), virtual computing machines (or "virtual machines (VMs)"), containers, pods, or any other type of computing resources. The workloads may be deployed to other types of computing resources, such as network components (or "network devices") in a serverless network by optimizing deployment locations that include the computing resources.

Generally, a workload orchestrator may allocate workloads to computing resources (e.g., devices or hosts) within workload resource domains (e.g., cloud networks) based on various types of considerations. The considerations used by the workload orchestrator may include business considerations (e.g., timeliness, legal/regulatory issues, asset control, global reach, etc.), technical considerations (e.g., performance, security, back-end integration, data volume, workload elasticity, etc.), ecosystem considerations (e.g., software as a service (SaaS) maturity, cloud service provider (CSP) offerings, market accessibility, etc.), and the like.

As noted above, the workload orchestrator may determine the analytics to collect and present for a requested component (e.g., a network function, service, or application requested to be implemented) based on the particular workloads deployed to implement the requested component. The workload orchestrator may determine the particular analytics (e.g., sets of performance metrics, composite metrics, etc.) based on the deployed workloads, the context of the deployed workloads within the requested component, and/or the preferences of the entities (e.g., users, customers, tenants, etc.) associated with the requested component. Further, in some examples, the workload orchestrator may receive requests from user devices including selections of particular analytics requested by the user to retrieve associated with execution of the workloads. For instance, the metrics may include various compute metrics, storage metrics, network metrics, and/or any number of other performance metrics. As noted above, although the user may know which performance metrics are relevant to monitor for the requested component, the user might not know the characteristics of the workloads deployed or the computing resources on which the workloads are deployed. Accordingly, the user may be unable to directly retrieve the relevant performance metrics from the telematics data repositories (e.g., logs, traces, etc.) of the computing resources. Instead, the requests from the users may allow the workload orchestrator to determine the relevant analytics from the corresponding computing resources executing the workloads for the requested component.

In some examples, the workload orchestrator also may determine one or more computing resources on which to deploy workloads for a requested component, based on the analytics configuration of the requested component. For instance, the workload characteristics, component characteristics, and/or analytics preferences of the associated entities may be used to determine which performance metrics are to be captured for a requested component implemented by the workload orchestrator. In such examples, the workload orchestrator may determine one or more computing resources on which to deploy the workloads, based on the performance metrics to be captured. For instance, if a first computing resource is capable of and configured to capture a relevant performance metric, and a second computing resource is not, then the workload orchestrator may select the first computing resource on which to deploy a workload for the requested component, so that the relevant performance metrics may be captured for the requested component. Thus, the workload orchestrator may deploy workloads to certain selected computing resource(s) based on determining that the relevant performance metrics for the requested component (and/or user requested metrics) are available via the selected computing resource(s).

In some examples, the relevant analytics associated with a requested component may include performance metrics captured from various computing resources, including even computing resources that are not executing workloads for the requested component. For instance, corresponding performance metrics may be retrieved and compared from one or more computing resources allocated with workload(s) of the requested component and one or more computing resources not allocated with workload(s) of the requested component. Because both sets of computing resources may be running other workload(s) associated with other services, functions, etc., the comparison of performance metric may provide data regarding the relative impact of the requested component on the performance of the computing resources.

In other examples, the workload orchestrator may migrate the workloads of the requested component from one or more current computing resources to one or more other computing resources, based at least in part on the analytics captured for the requested component. The workload orchestrator may determine to migrate the workloads based on determining the performance metrics of the current computing resource(s) executing the workloads of the requested component do not meet or exceed one or more performance thresholds. As an additional example, the workload orchestrator may utilize intent based descriptions indicated in requests (or "user requests") received from user devices to determine allocation and deployment of workloads based on performance metrics. One or more characteristics associated with intent based descriptions received in one or more requests may be utilized to determine one or more performance metrics associated with the relevant analytics of the requested component. The workload orchestrator may determine the performance metric(s) and use the performance metric(s) to determine one or more computing resources. The workload orchestrator may deploy the workloads to the computing resource(s), which execute the workloads and transmit the metric(s).

While these are merely illustrative examples, other criteria or characteristics (discussed further below) may be considered when determining optimal, or optimized, computing resources on which to deploy and execute the workloads. The techniques are generally applicable to any type of workload resource domain and network behavioral elements, including serverless networks. That is, the techniques for optimizing placement of workloads are generally applicable to any piece of software code that is a piece of networking behavior tailored to run in a convenient runtime environment (hardware or software) on a component in the network.

As described herein, a computing resource component may comprise any type of component, hardware-based, software-based, and/or network-based, etc., that is capable of hosting or running a service, cloud network function, serverless network function, and/or general-purpose application. For example, a computing resource component may comprise hardware-based devices (e.g., hosts) such as a server, a router, a network switch (e.g., leaf switch, spine switch, etc.), a gateway, a network interface card (NIC), a smart NIC, a Field Programmable Gate Array (FPGA), an Application-Specific Integrated Circuit (ASIC), and/or any other hardware device capable of executing a serverless network function. The computing resource component may comprise a software-based component as well, such as a virtual machine, container, and so forth.

FIG. 1 illustrates a system-architecture diagram of an environment 100 that includes a network architecture 102 of a workload resource domain that may include one or more data centers 104, and in which users 106 of user devices 108 may utilize a workload orchestrator 110 to request implementation of a requested component including one or more workloads 112. As described below, the workload orchestrator 110 may implement requested components within the network architecture 102 based on requests from the user devices 108, and also may configure the associated analytics for the requested components using an analytics component.

In some examples, the network architecture 102 may include devices housed or located in one or more data centers 104. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the network architecture 102 may not be located in explicitly defined data centers 104, but may be located in other locations or buildings.

The user devices 108 may establish communication connections over one or more networks 118 to communicate with devices in the network architecture 102, such as the workload orchestrator 110 and the analytics component 122 of the network architecture 102. The network(s) 118 may include any viable communication technology, such as wired and/or wireless modalities and/or technologies. Networks 118 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 108 may communicate using any type of protocol over the network 118, such as the transmission control protocol/Internet protocol (TCP/IP) that is used to govern connects to and over the Internet.

As illustrated, the user device 108 may receive requests via input to the user device 108 to implement one or more requested components within the network architecture 102. A requested component deployment 116 may include data defining network topology models representing requested components to be implemented within the network architecture 102. The requested component deployment 116 may be received by a component deployment system and directed to the workload orchestrator 110, which may be configured to determine and deploy the implementation of the requested software component. As noted above, in some examples, a user device 108 also receive one or more selections via user input indicating specific analytics (e.g., particular performance metrics and/or types of performance metrics) associated with the requested component deployment 116. In such examples, the workload orchestrator 110 may utilize the requested analytics when determining the workloads 112 for allocation and deployment to implement the requested component. In some examples, particular analytics configurations may be associated with a user account (e.g., an account associated with the user 106), and such analytics configuration may be retrieved and provided with the requested component deployment 116 to the workload orchestrator 110. Although user selection(s) indicating the requested component deployment 116 may be separate from the user selection(s) indicating the analytics configurations, it is not limited as such. In some examples, any of the selection(s) indicating a requested component deployment 116 may be integrated (e.g., combined) together with selection(s) indicating particular analytics.

When a requested component deployment 116 is transmitted as a request from a user device and routed to the workload orchestrator 110 (e.g., via a deployment system), the request may include a network topology associated with the requested software component, and/or user data (e.g., user or tenant configuration data or preferences) associated with the user account and/or the particular requested component deployment 116. Such user data may include software component priority data, a software component identifier, a software component type (e.g., a network function, service, general-purpose application, etc.), a software component version, resource consumption requirements for the requested component, etc. Additionally or alternatively to the user request, any of the requested component information may be determined based on historical data associated with workload resource consumption (e.g. consumption of one or more workload resources) from previous requested and deployed components. As noted above, in some instances, a user request from a user device may include analytics configuration metrics associated with the requested component deployment 116. In other instances, a requested component deployment 116 need not include any analytics configuration data from a user device, but instead the analytics configuration may be determined partially or entirely by the workload orchestrator 110, as described below.

After receiving a requested component deployment 116, the workload orchestrator 110 may determine the type, size, placement of workloads 112 to implement the requested software component. For instance, a network topology may include a number of interacting subcomponents (e.g., nodes), each of which may be separately deployed as one or more workloads 112. In this example, the workload orchestrator 110 may determine the various workloads, placements for each workload, and interactions between the workloads to successfully implement the functionality of network topology.

For a particular workload 112 (e.g., workload 112(a)), to determine the placement for the workload 112, the workload orchestrator 110 may determine one or more potential destination locations. In some instances, the determining of the placement may include determining one or more of computing resources (or "host(s)") 120a-120d (collectively referred to herein as hosts 120), as the potential destination location(s). For instance, the workload orchestrator 110 may determine the placement of the workload 112(s) as the host 120(a), based on the capabilities, the resource load/availability, deployment constraints, and the like, for each of the potential destination locations. Each host 120 may include any number of compute resources, storage resources, network resources, various network capabilities, functions, virtual machines, databases, containers, Hadoop nodes, applications, etc., and the workload orchestrator 110 may determine the placement of the workload based on the capabilities and current load/availability of each host 120.

After the workload orchestrator 110 determines, generates, and deploys the workloads for the requested component deployment 116 within the network architecture, the workloads may be executed by their respective hosts to perform the functionality of the requested software component. In this example, the workload orchestrator 110 has deployed workload 112(a) into host 120(a), and has deployed workload 112(b) and workload 112(c) into host 120(c). No workloads have been deployed into host 120(b) or host 120(d), although those hosts may be executing other workloads for other software components. In some instances, the workload orchestrator 110 may cause a host 120 to execute a workload 112, such as by transmitting, to the host 120, the workload 112, along with a request (e.g., an "orchestrator request") to execute the workload 112. For instance, the host 120(a) may execute the workload 112 based on receiving the workload 112, such as by automatically executing the workload 112 upon receipt. In other instances, the host 120(a) may execute the workload 112 based on information (or "workload orchestrator information") received from the workload orchestrator 110. The workload orchestrator information may indicate the workload 112, a priority (or "workload priority") associated with the workload 112, and/or corresponding performance metric associated with the workload 112. In any of the instances as discussed above, the host 120(a) may execute the workload 112 by adding a workload entry to a queue in the host 120(a), and executing the workload 112 based on the workload entry being at a top of the queue.

In conjunction with determining and deploying workloads 112 to implement the requested component deployment 116, the workload orchestrator 110 also may determine the analytics to be collected and presented associated with the requested component deployment 116. As noted above, the analytics determined for a requested component may include any analytics data (e.g., performance metrics, operational data, etc.) provided by a workload 112, a host 120, and/or a workload resource domain (e.g., a data center 104) of a network architecture 102. In various examples, the workload orchestrator 110 may determine particular sets of performance metrics based on the individual workloads 112 and combinations of workloads 112 deployed to implement the requested software component. Because analytics tools running on the user devices 108 and/or within the hosts 120 may be aware of how the workload orchestrator 110 has determined the resource orchestration for the requested component (e.g., what workloads 112 have been deployed in what hosts 120 to implement the particular component), such tools may be unable to accurately determine the relevant performance metrics associated with the component. In contrast, because the workload orchestrator 110 is aware of the resource orchestration for the requested component, it can more accurately determine the relevant performance metrics for the component within the various hosts 120 and cloud networks.

To configure the analytics for a deployed requested component, the workload orchestrator 110 may determine one or more sets of analytics data (e.g., performance metrics) based on the particular workloads 112 that have been deployed and the particular hosts 120 in which they have been deployed. In some cases, the workload orchestrator 110 may determine one or more performance metrics based on each particular workload 112 (e.g., workload 112(a)) and may retrieve the performance metrics from the corresponding host 120 on which the particular workload 112 is deployed (e.g., host 120(a)). Additionally, in some examples, the performance metrics retrieved for a workload 112 also may be based on the particular computing resources on which the workload has been deployed. For instance, if a workload 112 is deployed to a first computing resource (e.g., host 120(a)), then the workload orchestrator 110 may determine a first set of performance metrics to capture for the workload 112. However, if the same workload 112 is deployed to a second different computing resource (e.g., host 120(b)), then the workload orchestrator 110 may determine a different set of performance metrics to capture for the workload 112.

Additionally, in some cases, the relevant performance metrics determined by the workload orchestrator 110 can be based not only on the individual workloads 112, but on the particular combination of workloads 112 as orchestrated to perform the overall functionality of the requested component. For instance, the workload orchestrator 110 may analyze the network topology model for the requested component, the combination of deployed workloads 112, and/or other data relating to the context or purpose of the overall requested component, to determine which analytics to retrieve from the various hosts 120 on which the workloads 112 for the requested component are deployed. For instance, the workload orchestrator 110 may determine one set of performance metrics to retrieve for a workload 112 deployed as part of one type of requested component (e.g., a load balancer network function), and may determine a different set of performance metrics to retrieve for the same workload 112 deployed as part of a different type of requested component (e.g., a router or firewall network function) within a network functions virtualization (NFV) architecture.

Additionally or alternatively, the relevant performance metrics determined by the workload orchestrator 110 also may be based on the entity-specific analytics preferences (e.g., tenant-specific analytics data, user-specific analytics data, organization specific analytics data, etc.). For instance, the workload orchestrator 110 may determine one set of performance metrics for a workload 112 deployed based on a requested component deployment 116 from one entity, but may determine a different set of performance metrics for the same workload 112 deployed based on a similar or identical requested component deployment 116 from a different entity.

In the various examples described herein, after determining the particular set(s) of analytics for a requested component deployment 116, the workload orchestrator 110 may configure the hosts 120 and/or other components within the datacenter(s) 104 of the network architecture 102, so that the determined analytics are retrieved, analyzed, and presented the users/entities associated with the requested component deployment 116. In some examples, the workload orchestrator 110 may transmit data identifying the determined sets of performance metrics to retrieve (e.g., including the specific telemetry data metrics and the corresponding hosts 120 each of the telemetry data metrics) to an analytics component 122. In such examples, the analytics component 122 may retrieve and assemble the determined performance metrics from one or more telemetry data repositories. As shown in this example, a telemetry data repository 114 may be associated with a sets of hosts 120 within a datacenter 104, and may be configured to receive and store any number of telemetry data (e.g., performance metrics, operational parameters, etc.) from the individual hosts 120 and the workloads 112 executing thereon. The telemetry data repository 114 may be configured as a data lake and/or data warehouse in various examples, to aggregate the analytics the data collected by one or more hosts 120 in a central repository. However, as noted above, the workloads 112 and hosts 120 may generate many more types of analytics data than those relevant to the particular requested component deployment 116. Therefore, the analytics component 122 may be used to retrieve the specific subset of analytics (e.g., performance metrics) from the telemetry data repository 114 determined by the workload orchestrator 110 as being relevant to the requested component deployment 116.

In some examples, the computing resources (e.g., hosts 120) may be configured to collect and output uniform sets of analytics (e.g., the same sets of performance metrics) to the telemetry data repository 114, regardless of the number or types of workloads 112 executing on the hosts 120 at any particular time. In such examples, the analytics component 122 may be configured to retrieve a specific subset of the analytics from the telemetry data repository 114, based on the determinations of the workload orchestrator 110, described above, as to which analytics from which hosts 120 are relevant to the particular requested component. Additionally or alternatively, the workload orchestrator 110 may transmit analytics instructions the hosts 120, in conjunction with the resource orchestration, to instruct the hosts 120 of which analytics data to monitor/collect, how often to output specific analytics data, and/or where to transmit the specific analytics data (e.g., to a particular database within the telemetry data repository 114, or to the analytics component 122). In some cases, the workload orchestrator 110 also may provide the hosts 120 which specific instructions for formatting, customizing, and/or tagging (e.g., using metadata tags) particular analytics data associated with the requested component deployment 116, to allow the analytics component 122 to more readily retrieve the analytics data from the telemetry data repository 114.

After the workloads 112 for a particular requested component deployment 116 have been deployed and are executing within the computing resources (e.g., hosts 120) of the network architecture 102, the computing resources may periodically or continuously output analytics data to the telemetry data repository 114. The analytics component 122 may periodically or continuously retrieve the specific data analytics relevant to the requested component deployment 116, as determined by the workload orchestrator 110, from the telemetry data repository 114. As shown in this example, the analytics component 122 (and/or a presentation component, described in more detail below) may collect/assemble the relevant analytics data from the telemetry data repository 114 and use the analytics data to determine component performance data 124 associated with the requested component deployment 116. In some examples, the component performance data 124 may include sets of relevant performance metrics extracted from the telemetry data repository 114, based on the deployed workloads 112, configurations of the workloads 112, and the hosts 120 on which the workloads 112 are deployed. Additionally, in some cases, the analytics component 122 may use one or more underlying performance metrics from the telemetry data repository 114 to generate composite metrics associated with the deployed requested component. For instance, a composite performance metric may refer to a performance metric based on multiple different performance metrics within the telemetry data repository 114. Certain composite metrics may be based on similar or identical performance metrics collected by different hosts 120, and other composite metrics may be based on different types of performance metrics captured by the same or different hosts 120. As a simple example, analytics component 122 may retrieve analytics data indicating the numbers of customers and the power outputs from multiple different hosts 120 (e.g., the hosts 120 on which the workloads 112 of the requested component are deployed, and not other hosts 120) to compute an overall load metric associated with the requested component.

As described below, the component performance data 124 may take the form of component-specific dashboards (e.g., service specific dashboards, network function-specific dashboards, application-specific dashboards, etc.) for the requested component. Additionally or alternatively, the component performance data 124 may include alerts triggered by the analytics component 122 in response to certain analytics data (e.g., performance metrics or composite metrics) meeting or exceeding triggering thresholds for the alerts. Dashboards, alerts, reports, and/or any other type of performance data output may be based on any of the analytics or metrics described herein, including metrics relating to the performance, timing, throughput, efficiency, error or failure rates, and the like, for any analytics describes herein. For instance, for any one or more compute metrics, storage metrics, network metrics, specific applications metrics, service metrics, virtual machine metrics, database metrics, container metrics, and the like, and/or any composite metrics based on combinations of the first-order metrics generated by the computing resources, the analytics component 122 may determine, generate, and output performance data associated with a particular component based on the workloads 112 deployed to implement the component. In this example, a component performance user interface 126, which may correspond to a component-specific dashboard and/or alert, is shown displayed on a user device 108. In various examples, users 106 may request component dashboards and/or register for alerts via the analytics component 122, which may be received within web browser-based sessions and/or custom analytics applications.

The example performance metrics depicted in the component performance user interface 126 that are displayed may represent analytics that are collected and/or determined over a period of time (e.g., a period of time between a time at which the workloads 112 of the component begin executing until a time N hours later). The component performance data 124 may correspond to individual periods of time of any duration. Alternatively or additionally, one or more periods of time (e.g., periods (or "intervals") of time that are consecutive, or periods of time with one or more periods of time being spaced apart by other periods (or "intervening periods") during which metrics are not monitored) of any length of time, may be utilized to display the performance metrics.

In this way, workloads 112 may be routed to hosts 120 in order to perform operations that are traditionally performed to implement the functionality of a software component. However, the techniques described herein also include determine specific analytics (e.g., performance metrics and operational parameters) based on the workloads 112 deployed, the configuration of the workloads 112, and the hosts 120 on which the workloads 112 are deployed. By using the workload orchestrator 110 to determine and configure the relevant analytics associated with software components such as network functions, services, general-purpose applications, etc., the techniques described herein may provide more accurate analytics for particular components deployed within the network architecture 102. As described in the examples herein, the accuracy and efficiency of the analytics for a requested component may be improved by tracking the deployed workloads 112 and retrieving the relevant analytics based on the deployed workloads 112, without needing to retrieve and analyze metrics associated with workloads of separate components and/or workloads executing on different hosts. As a result, overall system efficiency and performance may be improved.

As described above, in some examples, the workload orchestrator 110 also may utilize a desired analytics configuration for a requested component deployment 116 to determine workload placement when implementing the deployment. For instance, the workload orchestrator 110 may determine the particular workloads 112 and/or the hosts 120 on which to deploy the workloads 112, based on the desired analytics configuration (e.g., the sets of performance metrics to be captured) for the requested component. In these examples, the deployment and updating of requested component implementations based on an analytics configuration may improve the robustness and efficiency of the analytics that can be collected and output for the component.

Although the workload orchestrator 110 in this example is depicted as being separate from the analytics component 122 (and/or from the presentation component, as discussed below), it is not limited as such. In some examples, the workload orchestrator 110 may be integrated into or combined with the analytics component 122 and/or a presentation component configured to determine, build, and output the component performance data 124 to the user devices 108. Further, although workloads 112 may be described in some examples as being compute functions, storage functions, and/or network functions, it is not limited as such. Any of the techniques related to workloads 112 as discussed herein may be implemented in a similar way for workloads 112 including one or more types of functions, including compute functions, storage functions, network functions, and any other type of functions.

As noted above, computing resource (or computing resource component) may comprise any type of component, hardware-based, software-based, and/or network-based, etc., that is capable of hosting or running a service, cloud network function, serverless network function, and/or general-purpose application. In some examples, computing resources may include resources with a host 120 that are utilized to execute workloads, as discussed in this disclosure. The term "computing resource(s)" also may be used throughout the disclosure herein to refer to analytics tools in a host or elsewhere within a computing environment, any combination of one or more resources (e.g., the computing resource(s) in a host or multiple hosts). The computing resource(s) according to any interpretation as discussed above may be utilized to implement the computing resources (s) utilized in any of the techniques as discussed throughout this disclosure.

Additionally, although the component performance user interface 126 in this example may be utilized to display the corresponding performance metrics as discussed above in this disclosure, it is not limited as such. In some examples, any portion of the component performance user interface 126 that is not being monitored may be omitted. The component performance user interface 126, instead of having three portions, may include any number (e.g., 2, 4, 6, 8, 10, 20, 40, etc.) of portions, with the individual portions (e.g., an upper portion and a lower portion) being utilized to display the corresponding metrics associated with the corresponding metrics provided by different hosts 120 and/or different composite metrics based on underlying data from multiple workloads 112 and/or multiple hosts 120. Although individual portions of the component performance user interface 126 may be utilized to display the corresponding metrics as a bar graph or a line graph as shown in this example, in other examples, individual portions of the component performance user interface 126 may be utilized to display the corresponding metrics in any form.

Figure 2:
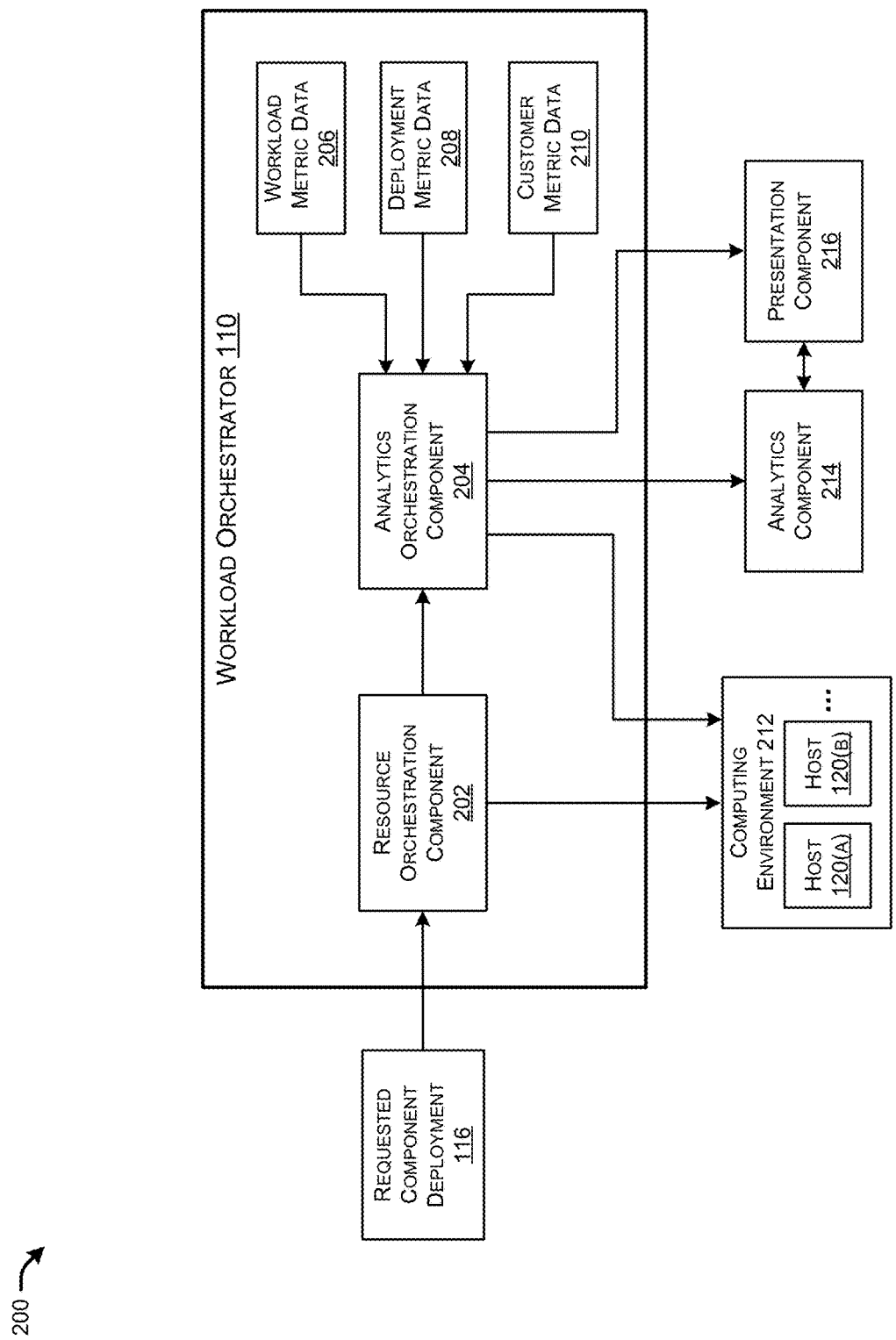
FIG. 2 illustrates a system diagram of a workload orchestrator, including a resource orchestration component configured to deploy workloads and an analytics orchestration component configured to determine and implement corresponding analytics for the deployed workloads.

FIG. 2 illustrates a diagram of a system 200 including a workload orchestrator 110, having a resource orchestration component 202 configured to deploy workloads, and an analytics orchestration component 204 configured to determine and implement corresponding analytics for the deployed workloads. As described above, the workload orchestrator 110 may be configured to implement requested software components such as services, network functions, and general applications, based on a requested component deployment 116 that may be received from a user device 108 or other computer system. The requested component deployment 116 may define the topology of the components to be implemented, including the various components, interfaces, and functionalities of the service, network function, or application, etc.

The resource orchestration component 202 may determine and deploy the resource orchestration for the requested component, for example, by deploying a number of workloads 112 within any number of computing devices (e.g., hosts 120) in a computing environment 212. The analytics orchestration component 204 may perform the various functionality described above to configure and implement the analytics for the component(s) deployed by the resource orchestration component 202, and to present performance data (e.g., component performance data 124) based on the analytics collected for the deployed component(s). As described above, the analytics orchestration component 204 may determine the particular analytics to be collected and presented for the requested component, based on the determinations of deployed workloads 112 (e.g., workload types, functionality, size, etc.), and based on the computing resources and/or environments into which the workloads 112 were deployed. Additionally, the analytics orchestration component 204 may use workload metric data 206, deployment metric data 208, and/or customer metric data 210 to determine the particular analytics for the requested component. The workload metric data 206 may include mappings (or other relationships) of workload types and/or characteristics to particular analytics to be collected. Similarly, the deployment metric data 208 may include mappings of requested software component types and/or component characteristics to particular analytics to be collected, and the customer metric data 210 may include mappings of customers (e.g., users, tenants, etc.) and/or customer characteristics to particular analytics to be collected. Based on the mappings in the workload metric data 206, deployment metric data 208, and/or customer metric data 210, and based on the workload deployment details for the requested component, the analytics orchestration component 204 may determine the particular analytics (e.g., performance metrics, composite metrics, etc.) to be collected or generated for the requested component.

In this example, after determining the particular analytics for the deployed requested component, the analytics orchestration component 204 may transmit the analytics to the analytics component 214, which may be configured to retrieve the underlying analytics data from various telemetry repositories, and assemble/generate the component-specific analytics based on the underlying analytics data associated with the computing resources/environments. Additionally or alternatively, the analytics orchestration component 204 may transmit analytic presentation instructions associated with component-specific analytics to the presentation component 216. For instance, analytic presentation instructions may include dashboard definitions, performance thresholds, alerts, and the like. The presentation component 216 may receive the updated component-specific analytics from the analytics component 214, and manage the presentation of the analytics (e.g., component performance data user interfaces, alerts, reports, etc.) to the users and user devices associated with the component.

Figure 3:
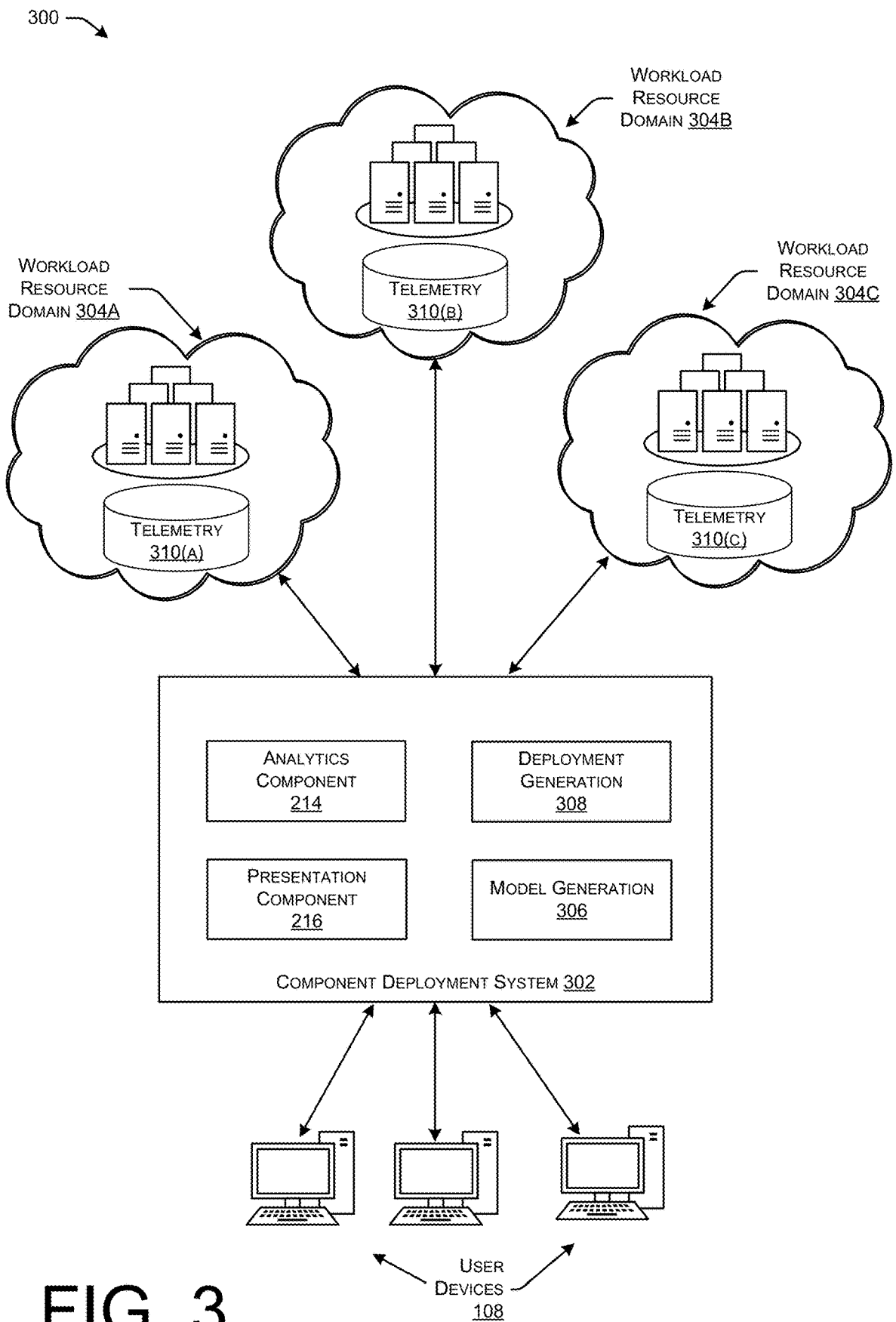
FIG. 3 illustrates a hybrid computing environment including multiple workload resource domains and a component deployment system configured to generate and deploy software components within the hybrid computing environment.

FIG. 3 illustrates a hybrid computing environment 300 including a component deployment system 302, multiple workload resource domains 304, and user devices 108. As described below, the component deployment system 302 may include and/or may be integrated with the workload orchestrator 110. The component deployment system 302, in combination with the workload orchestrator 110, may be configured to generate, deploy, monitor, and modify the requested software components represented as network topologies within the computing environment 300.

As noted above, the techniques described herein may relate to various types of requested software components, including simple and complex components executing on one or more computing resources within the computing environment 300. For instance, complex software services, network functions, and/or applications may be implemented based on topology models representing various subcomponents (or nodes) and the interactions between the nodes. Additionally, certain requested components may be implemented within a single workload resource domain, while others may be implemented across multiple resource domains. Hybrid network topologies may refer to large-scale computing systems and/or solutions that are implemented by several different nodes of various different types (e.g., network nodes, storage nodes, compute nodes, software application or service nodes, virtual machines or instances, etc.), which are deployed across multiple different workload resource domains, and which interact and communicate to provide the functionality of the overall topology. Workload resource domains 304 may refer to a dedicated pool of computer resources from which nodes may be allocated. In this example, workload resource domain 304A may correspond to a first public cloud computing environment, workload resource domain 304B may correspond to a second public cloud computing environment or to a separate private cloud computing environment, and workload resource domain 304C may correspond to yet another public or private cloud computing environment or to an on-premise datacenter, and so on. Although only three workload resource domains 304 are shown in this example, it should be understood that a network topology may be deployed across any number of different public clouds, public clouds, private clouds, on-premise datacenters, and/or other resource pools, in various embodiments.

In various examples, each of the workload resource domains 304 (which also may be referred to as domain infrastructures) of the multi-domain computing environment 300 may generally represent or comprise a resource pool. The resource pool of each workload resource domain 304 may comprise a data center, multiple data centers within the same enterprise, multiple data centers across enterprises, etc. As a specific example, a campus network of a school may be a type of workload resource domain 304A that is connected to a data center running in another domain infrastructure 304B by a connection through one or more networks, such as the Internet. Both of the domain infrastructures 304A and 304B may further be connected to a public cloud provider 304C as a third domain infrastructure. This is one example of the types of domain infrastructures 304 that may be interconnected to create a multi-domain environment 300. Generally, a workload resource domain 304 may comprise a set of resources that are managed, operated, and/or owned by the same or by different entities. In one specific example, the multi-domain environment 300 may comprise a multi-cloud environment that includes multiple public clouds, multiple private clouds (e.g., enterprise networks), a public cloud in combination with a private cloud/network, etc. However, the multi-domain environment 300 may also be utilized in other technologies. For instance, the multi-domain environment 300 may comprise domains of different devices in an Internet-of-Things (IoT) environments where each domain is a different grouping of IoT devices, and the domains are interconnected to form the multi-domain environment 300. Generally, the multi-domain environment 300 may comprise groupings of devices in different technology areas and/or different types of devices assigned to multiple domains that are connected to each other.

In some embodiments, the component deployment system 302 may be coupled directly or indirectly to a multi-workload resource domain network (e.g., multi-cloud network) that may include the Internet, one or more private clouds, public clouds, and/or other resource pools (e.g., on-premise datacenters). The component deployment system 302 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

The different nodes types that may operate within a hybrid network topology (e.g., network nodes, compute nodes, storage nodes, software application or service nodes, virtual machine instance nodes, etc.) each may correspond to or may be executed on one or more computers (e.g., hosts). As used herein, a "computer" may refer to one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special purpose computing devices.

In some embodiments, the component deployment system 302 may include one or more of a model generation component 306 and/or a deployment generation component 308. The model generation component 306 may determine a topology models for a deployment of requested component based on a logical model input, as well as based on resource inventories of the workload resource domains 304 and/or constraint input provided by a system architect or administrator. The model generation component 306 may provide the topology model for the requested component deployment to the deployment generation component 308, which may include various subcomponents configured to verify and optimize the topology, as well as deployment generation instructions programmed or configured to generate the topology as a requested software component within the hybrid environment 300. In some examples, a requested software component implemented on multiple workload resource domains 304 in a hybrid computing environment 300 may be referred to as network deployment.

Although not shown in FIG. 3 so as not to obscure the elements depicted therein, a hybrid computing environment 300 (which also may be referred to as a multi-cloud network, or a multi-resource pool network, etc.) may include any combination of one or more data communication networks through which the workload resource domains may communicate. Such data communication networks may include local area networks, wide area networks, internetworks or internets, using any of wireline or wireless links, including terrestrial or satellite links. The network(s) may be implemented by any medium or mechanism that provides for the exchange of data between the various elements of FIG. 3. The various elements of FIG. 3 may also have direct (wired or wireless) communications links. Workload resource domains 304 (e.g., private cloud network(s), public cloud network(s), on-premise datacenter(s), etc.), as well as component deployment system 302 and other elements of the environment 300 may each comprise a compatible interface and may be programmed or configured to use standardized protocols for communication across the networks such as TCP/IP, Bluetooth, and higher-layer protocols such as HTTP, TLS, and the like.

Each workload resource domain 304 may be implemented using a server-class computer or other computers having one or more processor cores, co-processors, or other computers. Workload resource domains 304 may include physical server computers and/or a virtual server instances stored in a datacenter, such as through cloud computing. Additionally or alternatively, workload resource domains 304 such as public and/or private cloud networks, may comprise one or more applications executing on a server computer system which comprises instructions for application modeling and appliance/hardware mapping. Workload resource domains 304 may further comprise one or more network policies using notions such as templates or profiles that can be applied to different points in the hybrid computing environment 300.

In some embodiments, the component deployment system 302 may be distributed across one or more of the workload resource domains 304, which may be bridged by a cloud service configured to integrate and virtualize various hierarchical layers of different public or private cloud networks, on-premise datacenters, etc. The individual workload resource domains 304 may comprise respective gateways (e.g., cloud gateways) that may translate cloud storage Application Programming Interfaces (APIs) to block-based storage protocols by using standard network protocols which integrate with existing applications within hybrid computing environment 300.

As noted above, in some examples, telemetry data including performance metrics and/or operational feedback data may be received from a requested component deployed as a network topology across multiple workload resource domains 304. As shown this example, each workload resource domain 304 may include a telemetry data repository 310 which may be similar or identical to the telemetry data repository 114 described above in reference to FIG. 1. In this example, the telemetry data repositories 310(a)-310(c) each may transmit their respective analytics data (e.g., performance metrics, operational status data and parameters, etc.) for the workloads deployed within the corresponding workload resource domain 304, to the component deployment system 302. In this example, the component deployment system 302 also includes an analytics component 214 and a presentation component 216, which may be similar or identical to the corresponding components discussed above in reference to FIG. 2. As discussed above, the analytics component 214 and the presentation component 216 may be configured to determine and configure the analytics associated with a particular requested software component (e.g., a network deployment in hybrid environment 300), and to output performance data based on the analytics.

However, before any analytics can be received based on a network topology, the network topology may be initially determined and deployed within the hybrid network environment 300. Such deployment of network topologies across multiple workload resources may include receiving logical model input describing a prospective network topology and/or one or more predefined constraints to be placed on the formal/physical model. In some embodiments, the logical model input and/or the constraints may be received from a tenant user or system administrator via a user device 108 (e.g., as a requested component deployment 116). The component deployment system 302 then may automatically generate a physical network topology for the hybrid network deployment, including transmitting sets of deployment instructions from the deployment generation component 308 to gateways within the different workload resource domains 304. In some embodiments, the physical network topology determined within the model generation component 306 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some embodiments, the input received from a user device 108 describing the prospective network topology of the requested component may account for multiple workload resource domains 304, including at least one public cloud network associated with a public cloud network provider, and at least one private cloud network associated with an enterprise. The enterprise may include programs, service models, and applications which reside in an on-premise datacenter of the enterprise. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

In some examples, constraint inputs may be received from network tenants, administrators, etc., via user devices 108 may specify one or more constraints upon the realization of the logical topology within individual private cloud computing infrastructures and/or individual public cloud computing infrastructures within the hybrid network environment 300. In such cases, the model generation component 306 may optimize the intermediate topology based upon the constraint input, including automatically remapping the intermediate topology to an optimized network topology by moving functional elements (e.g., nodes or groups of nodes) from a first workload resource domain (e.g., a public cloud) in the intermediate topology, into a different workload resource domain (e.g., a private cloud or on-premise datacenter) in the final formal network topology. In some cases, constraint inputs may specify one or more attributes of a private cloud infrastructure or public cloud infrastructure.

Although the hybrid computing environment 300 may be considered a single computer network, as may each individual workload resource domain 304 within the computing environment 300. As noted above, each of the networks may include a number of network devices configured for intra- and internetwork communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The network devices may comprise physical nodes (e.g., processors, chipsets, devices, etc.), virtual nodes (virtual machines, containers, etc.), and/or any combination thereof.

Individual workload resource domains 304 may, in some cases, correspond to datacenters operating in one or more physical locations. Such datacenters (or other physical locations) may be physical facilities or buildings located across geographic areas that designated to store networked devices that are part of the corresponding workload resource domain 304. These data centers also may include various networking devices, as well as redundant or backup components and infrastructure for power supply, data communications connections, environmental controls, and various security devices. In some examples, a workload resource domain 304 may include one or more virtual data centers which are a pool or collection of cloud infrastructure resources specifically designed for enterprise needs, and/or for cloud-based service provider needs. Generally, the workload resource domains 304 (physical and/or virtual) may provide basic resources such as processor (CPU), memory (RAM), storage (disk), and networking (bandwidth). However, in some examples the network devices of the workload resource domain 304 might not be located in explicitly defined datacenters, but may operate from other physical locations.

The user devices 108 through which the component deployment system 302 may be controlled, may comprise any type of computing device through which a user is able to interact with other devices (e.g., phones, tablets, personal computing devices, wearable devices, network devices, etc.). In some examples, users of the user devices 108 may have registered accounts with the component deployment system 302 in order to generate models, create and modify topologies, deploy topologies within the workload resource domains 304, and/or request and receive analytics associated with the deploy topologies (e.g., component-specific dashboards and/or alerts). For instance, a topology design tool, constraint input tool, optimization or recommendation tools, and various analytics tools may be provided by the component deployment system 302 and accessible to authorized users at user devices 108 via a client portal (e.g., command line interface (CLI), application programming interface (API), web-based portal, etc.) and/or user interfaces. The user devices 108 may operate within and communicate with the component deployment system 302 (and/or any other devices in the computing environment 300) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some examples, the workload orchestrator 110 may be implemented as a component deployment system 302, or vice versa. A workload orchestrator 110 also may integrated within the component deployment system 302, for instance, within the deployment generation component 308. In other cases, any number of workload orchestrators 110 may be associated with and/or implemented within the individual workload resource domains 304. As described herein, the component deployment system 302 may include one or more computing devices (e.g., a single device, multiple devices, network(s) of devices, etc.) comprising one or more processors configured to execute various computer-executable instructions. Additionally, component deployment system 302 may include components, modules, etc., that are stored on non-transitory computer-readable media and configured to perform the techniques and operations described herein as being performed by the component deployment system 302. For instance, the component deployment system 302 may include the model generation component 306, the deployment component 308, and/or any other number or arrangement of components. The components described herein are merely illustrative, and any number or configuration of components may be utilized to perform the techniques described herein.

Figure 4:
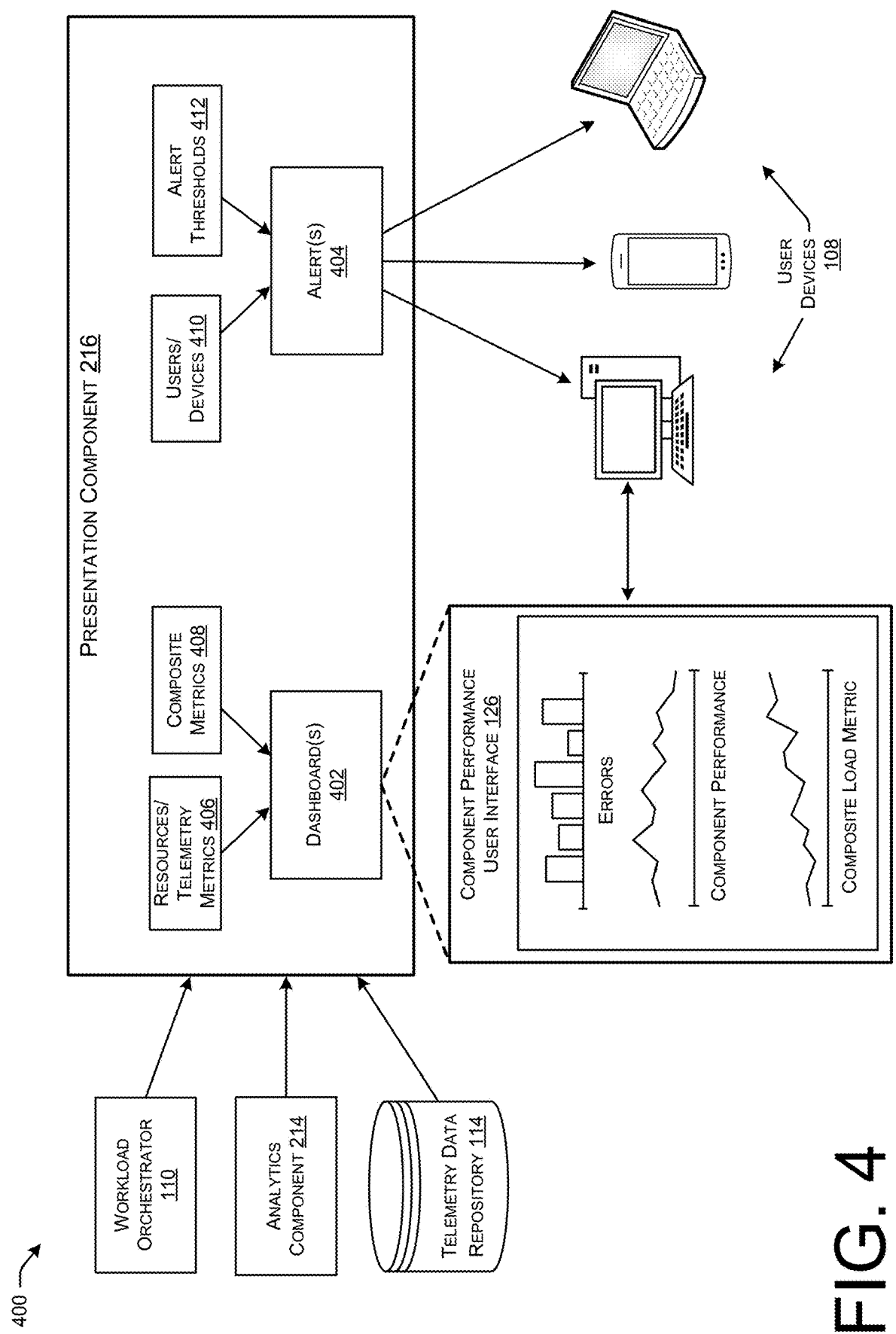
FIG. 4 illustrates a system diagram of a presentation component associated with workload orchestrator, configured to generate and output software component-specific dashboards and alerts based on analytics received from various computing resources associated with the software component.

FIG. 4 illustrates a diagram of a system 400 including a presentation component 216 associated with workload orchestrator 110. As shown in this example, the presentation component 216 may be configured to generate and output component-specific analytics data, including component-specific dashboards and/or alerts, for services, network functions, and/or other requested software components deployed by the workload orchestrator 110. In this example, the presentation component 216 includes a dashboard component 402 configured to aggregate the component-specific analytics for the requested component and assemble dashboards that may be provided to authorized user devices 108 via web browser-based sessions and/or custom analytics applications. In some examples, the dashboard component 402 may assemble a component-specific dashboard based on any number of telemetry data metrics collected by the computing resources executing the workloads 112 of the component. The telemetry data metrics may be analyzed and formatted for presentation within a dashboard, and the dashboard component 402 may determine a combination of first-order metrics 406 generated by the computing resources and/or composite metrics 408 based on combinations of the first-order metrics and/or other data.

In this example, the presentation component 216 also includes an alerts component 404 configured to generate alerts to various user devices 108 based on thresholds associated with the component-specific analytics. In some cases, the alerts component 404 may monitor analytics metrics (e.g., performance data values, operational states, etc.) received from the analytics component 214 to determine if and when an alert is to be triggered. Such analytics metrics may be received periodically or continuously from the analytics component 214. In response to receiving updated component-specific analytics, the presentation component 216 may access the user/devices component 410 to determine any alerts that have been defined based on the received analytics, and/or may access the alert thresholds component 412 to determine the thresholds associated with the alerts. In response to one or more analytics data (e.g., a single telemetry data value, composite performance metric, and/or aggregation of multiple metrics, etc.) meeting or exceeding a threshold alert condition, the presentation component 216 may determine a user 106 or a user device 108 registered to receive an alert, and may generate and output an alert to the user 106 and/or user device 108. In various examples, an alert may be output using any number of computing technologies and/or protocols, such as SMS, web links, emails, custom application notifications, and the like. An alert output by the presentation component 216 may include, for example, the component-specific analytics metric that triggered the alert, the associated threshold value, and/or historical data associated with the analytics metric.

Figure 5:
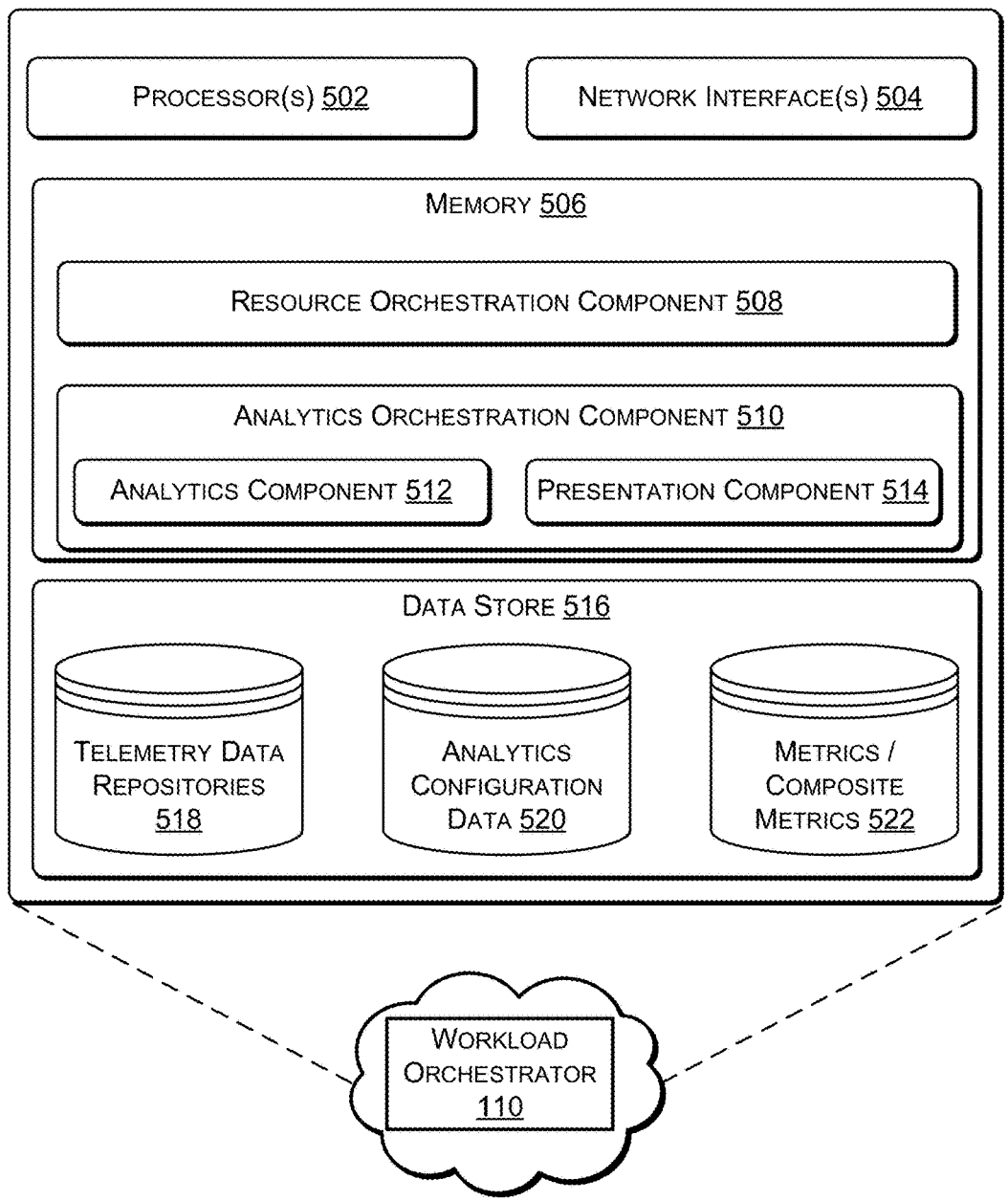
FIG. 5 illustrates a computing system diagram illustrating a configuration for a workload orchestrator that may be utilized to implement aspects of the technologies disclosed herein.

FIG. 5 illustrates a computing system diagram 500 illustrating a configuration for a workload orchestrator that may be utilized to implement aspects of the technologies disclosed herein.

Generally, the workload orchestrator 110 may be a programmable controller that manages some or all of workload placement activities. Generally, the workload orchestrator 110 may handle at least the functions of (i) receiving user requests including metrics, metric priority values, and/or intent based descriptions, (ii) determining metrics based on intent based descriptions, and (iii) utilizing metrics of various types (e.g., requested metrics, orchestrator metrics, and/or intent based metrics), host availability, and/or numbers/priorities of observability types provided by computer resources (e.g., hosts) to determine workload placement.

As illustrated, the workload orchestrator 110 may include, or run on, one or more hardware processors 502 (processors), one or more devices, configured to execute one or more stored instructions. The processor(s) 502 may comprise one or more cores. Further, the workload orchestrator 110 may include or be associated with (e.g., communicatively coupled to) one or more network interfaces 504 configured to provide communications with the user devices 108 and other devices, and/or other systems or devices in the workload orchestrator 110 and/or remote from the workload orchestrator 110. The network interface(s) 504 may include devices configured to couple to personal area networks (PANs), wired and wireless local area networks (LANs), wired and wireless wide area networks (WANs), and so forth. For example, the network interface(s) 504 may include devices compatible with any networking protocol.

The workload orchestrator 110 may also include memory 506, such as computer-readable media, that stores various executable components (e.g., software-based components, firmware-based components, etc.). The memory 506 may generally store components to implement functionality described herein as being performed by the workload orchestrator 110. The memory 506 may store a resource orchestration component 508 and an analytics orchestration component 510, which may be similar or identical to the resource orchestration component 202 and an analytics orchestration component 204 described above. The resource orchestration component 508 may determine and deploy the resource orchestration for the requested software component (e.g., deploying the workloads 112 in hosts 120 to implement the particular component), and the analytics orchestration component 510 may configure and use the analytics for the particular component as described herein. Further, the memory 506 may store an analytics orchestration component 510 configured to place workloads on computing resources (e.g., hosts). As shown in this example, the analytics orchestration component 510 may include an analytics component 512 and a separate presentation component 514 which may be similar or identical to the analytics component 214 and the presentation component 216. Although in this example, the analytics component 512 and the presentation component 514 may be implemented within the analytics orchestration component 510, in other examples these components may be implemented separately from the analytics orchestration component 510 and/or from the workload orchestrator 110, as shown in FIG. 2.

The workload orchestrator 110 may further include a data store 516, such as long-term storage, that stores one or more telemetry data repositories 518, such as data including analytics/performance metrics of various types from various computing resources and/or workload resource domains. The data store 516 also may store analytics configuration data 520, which may include tables or other data linking and associated particular workloads, types of requested software components, and/or entities, to particular analytics configurations. As discussed above, an analytics configuration may identify one or more sets of analytics/performance metrics to be collected based on the associated deployed workload, component, and/or entity, etc. As shown in this example, the data store 516 also may include metrics data 522, including the performance metrics (e.g., first-order telemetry data and/or composite metrics) collected for the components that have been deployed and executed within the computing environment.

In some instances, the steps of process 600 may be performed by a device and/or a system of devices that includes one or more processors and one or more non-transitory computer-readable media storing computer-executable instructions that, when executed by the one or more processors, cause the one or more processors to perform operations of process 600.

Figure 6:
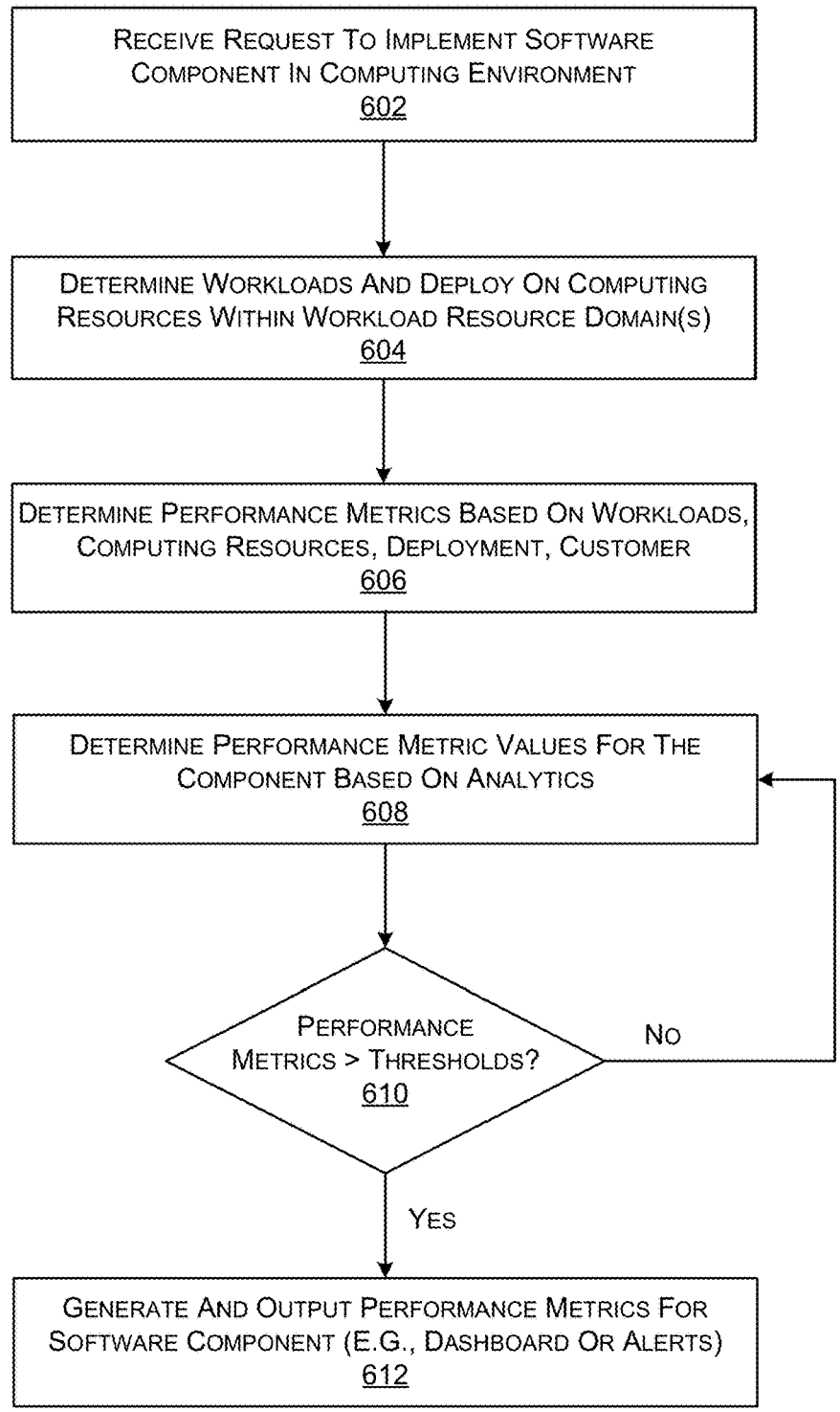
FIG. 6 illustrates a flow diagram of an example technique for deploying workloads to implement a software component, and configuring analytics associated with the software component based on the deployed workloads.

FIG. 6 illustrates a flow diagram of an example process 600 for deploying a workload.

FIG. 6 illustrates a flow diagram of an example process 600 for deploying workloads to implement a requested software component, and configuring analytics associated with the requested component based on the deployed workloads. As described below, process 600 illustrates various aspects of the functions performed at least partly by a workload orchestrator 110 and/or the additional device(s) and systems described above in connection with FIGS. 1-5. The logical operations described herein with respect to FIG. 6 may be implemented (1) as a sequence of computer-implemented acts or program modules running on a computing system and/or (2) as interconnected machine logic circuits or circuit modules within the computing system. Additionally, the implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6 and described herein. These operations can also be performed in parallel, or in a different order than those described herein. Some or all of these operations also may be performed by components other than those specifically identified. Although the techniques described in this disclosure is with reference to specific components, in other examples, the techniques may be implemented by less components, more components, different components, or any configuration of components.

At operation 602, a workload orchestrator 110 may receive a request to implement a component within a computing environment. As discussed above, the component may be a cloud-based service, network function, general-purpose application, and/or any other requested component that can be deployed within a network architecture 102. In some examples, the workload orchestrator 110 may receive the request as a requested component deployment 116 from a user device 108 associated with a customer or tenant, etc. A requested component deployment 116 may include data defining a network topology model representing the requested component to be implemented, and/or may include selections of particular requested analytics (e.g., particular performance metrics and/or types of performance metrics) associated with the with the requested component deployment 116.

At operation 604, the workload orchestrator 110 may determine the workloads and computing resources on which to implement the requested component within the computing environment. As described above, the workload orchestrator 110 may determine any number of workloads 112 of various types, sizes, and functionalities. The workload orchestrator 110 also may determine placement of the various workload on computing resources (e.g., hosts 120). In various examples, the component may be deployed on computing resources within a single workload resource domain, or across multiple workload resource domains in a hybrid computing environment.

At operation 606, the workload orchestrator 110 may determine one or more performance metrics based on the deployment of the workloads 112 in the computing resources to implement the requested software component. As described above, the workload orchestrator 110 may determine the specific analytics for the component (e.g., performance metrics, composite metrics, operational data, etc.) based on the particular type and configuration of individual workloads deployed, the computing resources onto which the workloads were deployed, the context (or purpose) of the individual workloads within the overall functionality of the requested component, and/or the entity that requested the implementation of the requested component.

At operation 608, the workload orchestrator 110 may determine one or more component-specific performance metric values based on the underlying analytics collected for the deployed component. For example, an analytics component 122 may retrieve and assemble the determined performance metrics from one or more telemetry data repositories 114 associated with the various computing resources on which the component is implemented. As described above, the analytics component 122 may be used to retrieve the specific subset of analytics (e.g., performance metrics) from the telemetry data repository 114 determined by the workload orchestrator 110 as being relevant to the deployed component, and may exclude unrelated performance metrics associated with different workloads and/or different computing resources.

At operation 610, the workload orchestrator 110 may compare the component-specific performance metric values determined in operation 608 to one or more thresholds. In this example, the configuration of analytics for the component may include generating one or more alerts based on component-specific performance metrics meeting or exceeding one or more threshold values. As described above, a presentation component 216 associated with the workload orchestrator 110 may receive updated component-specific analytics from an analytics component 214, and may determine whether the performance metrics for the component meet or exceed one or more threshold alert conditions. When the performance metrics for the deployed component do not meet or exceed the threshold(s) (610: No), then process 600 may return to operation 608 to continue to receive and evaluate the updated performance metrics for the deployed component.

In contrast, when the performance metrics for the deployed component meet or exceed the threshold(s) (610: Yes), then the process 600 may proceed to operation 612 during which the workload orchestrator may output various performance data associated with the component. In various examples, the component-specific performance data may be output to user devices 108 associated with the component as a component-specific dashboard based on the analytics data collected by the computing resources executing the workloads 112 of the component, and/or as notification alerts to specific users or devices triggered based on the performance metric thresholds defined for the component.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An orchestration system, comprising:
one or more processors; and
one or more non-transitory computer-readable media storing computer-executable instructions that, when executed by the one or more processors, cause the one or more processors to perform operations comprising:

receiving, at an orchestrator that orchestrates a network service, data associated with a software component of the network service to be deployed within a computing environment, the data including an intent-based description associated with deploying the network service;

deploying, by the orchestrator, a first workload of the network service on a first computing resource within the computing environment, wherein the first workload performs a first task to achieve an overall functionality of the network service;

deploying, by the orchestrator, a second workload of the network service on a second computing resource within the computing environment, wherein the second workload performs a second task to achieve the overall functionality of the network service;

storing, at the orchestrator, a first performance threshold indicating degraded performance of the first workload;

storing, at the orchestrator, a second performance threshold indicating degraded performance of the second workload;

determining, based at least in part on the intent-based description, first performance metrics that are relevant for the first workload;

sending, from the orchestrator and to an analytics subsystem, a first indication of the first performance metrics to determine for the first workload using first telemetry data;

determining, based at least in part on the intent-based description, second performance metrics that are relevant for the second workload;

sending, from the orchestrator and to the analytics subsystem, a second indication of the second performance metrics to determine for the second workload using second telemetry data;

based at least in part on the first indication, retrieving, by the analytics subsystem, the first telemetry data;

based at least in part on the second indication, retrieving, by the analytics subsystem, the second telemetry data;

determining, by the analytics subsystem, a first performance metric associated with the first workload of the software component, based at least in part on first telemetry data received from the first computing resource and for the first workload;

determining, by the analytics subsystem, a second performance metric associated with the second workload, based at least in part on second telemetry data received from the first computing resource and for the second workload;

sending the first performance metric and the second performance metric from the analytics subsystem and to the orchestrator;

comparing the first performance metric versus the first performance threshold to determine that the first performance metric violates the first performance threshold; and outputting, via a client device associated with the software component, performance data that indicates at least the first performance metric of the first workload violating the first performance threshold.

2. The orchestration system of claim 1, wherein the first performance metric is a composite metric based at least in part on the first performance metric and the second performance metric, the operations further comprising:

receiving, from a telemetry data repository, a first value of the first performance metric;

receiving, from the telemetry data repository, a second value of the second performance metric; and determining a value associated with the composite metric, based at least in part on the first value and second value.

3. The orchestration system of claim 2, wherein:

the first computing resource is deployed within a first workload resource domain and the second computing resource is deployed within a second workload resource domain;

the first value of the first performance metric is generated by the first computing resource; and the second value of the second performance metric is generated by the second computing resource.

4. The orchestration system of claim 3, the operations further comprising:

determining the first performance metric based at least in part on the first workload deployed on the first computing resource and the second workload deployed on the second computing resource.

5. The orchestration system of claim 1, the operations further comprising:

receiving, from a first entity, a request to implement the software component within the computing environment, wherein determining the first performance metric is further based at least in part on the first entity.

6. The orchestration system of claim 1, wherein the software component comprises at least one of a network function, a service, or a cloud-based application.

7. The orchestration system of claim 1, wherein outputting the performance data comprises transmitting an alert to the client device, based at least in part on the first performance metric violating the first performance threshold.

8. The orchestration system of claim 1, wherein outputting the performance data comprises outputting a dashboard associated with the software component, the dashboard including a plurality of performance metric values based on telemetry data associated with a plurality of computing resources within the computing environment.

9. A method, comprising:

receiving, by an orchestration system that orchestrates a network service, data associated with a software component of the network service to be deployed within a computing environment, the data including an intent-based description associated with deploying the network service;

deploying, by the orchestration system, a first workload of the network service on a first computing resource within the computing environment, wherein the first workload performs a first task to achieve an overall functionality of the network service;

deploying, by the orchestration system, a second workload of the network service on a second computing resource within the computing environment, wherein the second workload performs a second task to achieve the overall functionality of the network service;

storing, at the orchestration system, a first performance threshold indicating degraded performance of the first workload;

storing, at the orchestration system, a second performance threshold indicating degraded performance of the second workload; determining, based at least in part on the intent-based description, first performance metrics that are relevant for the first workload;

sending, from the orchestration system and to an analytics subsystem, a first indication of the first performance metrics to determine for the first workload using first telemetry data;

determining, based at least in part on the intent-based description, second performance metrics that are relevant for the second workload;

sending, from the orchestration system and to the analytics subsystem, a second indication of the second performance metrics to determine for the second workload using second telemetry data;

based at least in part on the first indication, retrieving, by the analytics subsystem, the first telemetry data;

based at least in part on the second indication, retrieving, by the analytics subsystem, the second telemetry data;

determining a first performance metric associated with the first workload of the software component, based at least in part on first telemetry data received from the first computing resource and the first workload;

determining a second performance metric associated with the second workload, based at least in part on second telemetry data received from the first computing resource and for the second workload;

sending the first performance metric and the second performance metric from the analytics subsystem and to the orchestration system;

comparing the first performance metric versus the first performance threshold to determine that the first performance metric violates the first performance threshold; and outputting, by the orchestration system, via a client device associated with the software component, performance data that indicates at least the first performance metric of the first workload violating the first performance threshold.

10. The method of claim 9, wherein the first performance metric is a composite metric based at least in part on the first performance metric and the second performance metric, further comprising:

receiving, from a telemetry data repository, a first value of the first performance metric;

receiving, from the telemetry data repository, a second value of the second performance metric; and determining a value associated with the composite metric, based at least in part on the first value and second value.

11. The method of claim 10, wherein:

the first computing resource is deployed within a first workload resource domain and the second computing resource is deployed within a second workload resource domain;

the first value of the first performance metric is generated by the first computing resource; and the second value of the second performance metric is generated by the second computing resource.

12. The method of claim 11, further comprising:

determining the first performance metric based at least in part on the first workload deployed on the first computing resource and the second workload deployed on the second computing resource.

13. The method of claim 9, further comprising:

receiving, from a first entity, a request to implement the software component within the computing environment, wherein determining the first performance metric is further based at least in part on the first entity.

14. The method of claim 9, wherein the software component comprises at least one of a network function, a service, or a cloud-based application.

15. The method of claim 9, wherein outputting the performance data comprises transmitting an alert to the client device, based at least in part on the first performance metric violating the first performance threshold.

16. The method of claim 9, wherein outputting the performance data comprises outputting a dashboard associated with the software component, the dashboard including a plurality of performance metric values based on telemetry data associated with a plurality of computing resources within the computing environment.

17. A non-transitory computer-readable medium storing processor-executable instructions that, when executed by one or more processors, cause the one or more processors to perform operations comprising:

receiving, at an orchestrator that orchestrates a network service, data associated with a software component of the network service to be deployed within a computing environment, the data including an intent-based description associated with deploying the network service;

deploying, by the orchestrator, a first workload of the network service on a first computing resource within the computing environment, wherein the first workload performs a first task to achieve an overall functionality of the network service;

deploying, by the orchestrator, a second workload of the network service on a second computing resource within the computing environment, wherein the second workload performs a second task to achieve the overall functionality of the network service;

storing, at the orchestrator, a first performance threshold indicating degraded performance of the first workload;

storing, at the orchestrator, a second performance threshold indicating degraded performance of the second workload;

determining, based at least in part on the intent-based description, first performance metrics that are relevant for the first workload;

sending, from the orchestrator and to an analytics subsystem, a first indication of the first performance metrics to determine for the first workload using first telemetry data;

determining, based at least in part on the intent-based description, second performance metrics that are relevant for the second workload;

sending, from the orchestrator and to the analytics subsystem, a second indication of the second performance metrics to determine for the second workload using second telemetry data;

based at least in part on the first indication, retrieving, by the analytics subsystem, the first telemetry data;

based at least in part on the second indication, retrieving, by the analytics subsystem, the second telemetry data;

determining, by the analytics subsystem, a first performance metric associated with the first workload of the software component, based at least in part on first telemetry data received from the first computing resource and the first workload;

determining, by the analytics subsystem, a second performance metric associated with the second workload, based at least in part on second telemetry data received from the first computing resource and for the second workload;

sending the first performance metric and the second performance metric from the analytics subsystem and to the orchestrator;

comparing the first performance metric versus the first performance threshold to determine that the first performance metric violates the first performance threshold; and outputting, via a client device associated with the software component, performance data that indicates at least the first performance metric of the first workload violating the first performance threshold.

18. The non-transitory computer-readable medium of claim 17, wherein the first performance metric is a composite metric based at least in part on the first performance metric and the second performance metric the operations further comprising:

receiving, from a telemetry data repository, a first value of the first performance metric;

receiving, from the telemetry data repository, a second value of the second performance metric; and determining a value associated with the composite metric, based at least in part on the first value and second value.

19. The non-transitory computer-readable medium of claim 18, wherein:

the first computing resource is deployed within a first workload resource domain and the second computing resource is deployed within a second workload resource domain;

the first value of the first performance metric is generated by the first computing resource; and the second value of the second performance metric is generated by the second computing resource.

20. The non-transitory computer-readable medium of claim 19, the operations further comprising:

determining the first performance metric based at least in part on the first workload deployed on the first computing resource and the second workload deployed on the second computing resource.

* * * * *